United States Patent [19]

Dennis

[11] 4,402,539
[45] Sep. 6, 1983

[54] REUSABLE CABLE TERMINATION

[75] Inventor: Norman G. Dennis, Poplarville, Miss.

[73] Assignee: The United States of America as represented by the Secretary of the Navy, Washington, D.C.

[21] Appl. No.: 280,166

[22] Filed: Jul. 2, 1981

[51] Int. Cl.³ .................. B66C 1/10; F16G 11/00
[52] U.S. Cl. ................... 294/78 R; 24/115 R
[58] Field of Search ............... 294/78 R, 78 A, 82 R, 294/84; 24/115 R, 115 H, 115 J, 115 K, 115 M, 117, 118, 127, 129 R, 129 A, 129 B, 136 R, 136 K; 114/218; 188/65.1, 65.2, 65.4; 254/391, 403, 408, 411

[56] References Cited

U.S. PATENT DOCUMENTS

| | | | |
|---|---|---|---|
| 417,180 | 12/1889 | Harvey | 24/136 R |
| 488,565 | 12/1892 | Kleitz | 24/129 R |
| 1,553,430 | 9/1925 | Bittle | 24/129 R |
| 1,984,241 | 12/1934 | Sumenius | 24/115 |
| 2,202,968 | 6/1940 | Simler | 24/127 |
| 2,223,389 | 12/1940 | Schaedler | 24/132 |
| 2,551,065 | 5/1951 | Speer | 24/115 |
| 2,691,478 | 10/1954 | Frankel | 24/136 R X |
| 2,715,008 | 8/1955 | Huber | 248/361 |
| 2,970,357 | 2/1961 | Pinson et al. | 24/126 |
| 3,398,714 | 8/1968 | Wallin et al. | 114/218 |

OTHER PUBLICATIONS

"The Effect of Corroded Hydrographic Wire on Particulate Iron Concentrations in Seawater" by Peter R. Betzer and Michael E. Q. Pilson from Deep-Sea Research, Feb. 75.

*Primary Examiner*—Johnny D. Cherry
*Attorney, Agent, or Firm*—R. F. Beers; Francis I. Gray

[57] ABSTRACT

A reusable cable termination which will not add trace contaminants to samples of the environment. A main frame has two parallel immovable grooved discs with a crossover area so that a cable can pass smoothly from one disc to the other. Transition segments, which are portions of a third immovable disc, provide a turn of controlled radius so that the cable leaves tangentially from the discs. The free end and supporting end of the cable are secured by bowspring clamps. The transition segments and discs provide capstan action to unidirectionally amplify tension on the cable. The material of the termination is of a material which has the necessary mechanical strength and corrosion resistance.

7 Claims, 3 Drawing Figures

REUSABLE CABLE TERMINATION

BACKGROUND OF THE INVENTION

1. Field of the Invention

The present invention relates to cable terminations, and more particularly to a reusable cable termination which will not contaminate samples of the ocean environment with trace elements.

2. Description of the Prior Art

In oceanic water sampling for trace metals including iron there has been a wide variation in measured particulate iron concentrations which suggest the probability of contamination from suspending cables and terminations—the mechanical transition between a long cable and a suspended vehicle. Termination contamination can arise in two ways: (1) sea water in the external vicinity of the termination can contact directly any metallic surfaces on the termination; and (2) if the cable surface within the termination has been deliberately broken to provide an internal electric interface, then water discharged from the interior of the cable when the external pressure is decreased can contact interior metallic surfaces of the termination and be contaminated upon discharge from the termination. Also, presently terminations are permanently attached to the cable and enclose portions of the cable, preventing complete inspection of the cable and requiring a new termination if a portion of the cable is damaged.

SUMMARY OF THE INVENTION

Accordingly, the present invention provides a reusable cable termination which will not add trace contaminants to samples of the environment. A main frame has two parallel immovable grooved discs with a crossover area so that a cable can pass smoothly from one disc to the other. Transition segments, which are portions of a third immovable disc, provide a turn of controlled radius so that the cable leaves tangentially from the discs. The free end and supporting end of the cable are secured by bowspring clamps. The transition segments and discs provide capstan action to unidirectionally amplify tension on the cable. The material of the termination is of a material which has the necessary mechanical strength and corrosion resistance.

Therefore, it is an object of the present invention to provide a reusable cable termination which does not contaminate samples of the environment.

Another object of the present invention is to provide a reusable cable termination which allows complete visual inspection of the termination and the cable.

Other objects, advantages and novel features of the present invention will be apparent from the following detailed description when read in conjunction with the appended claims and attached drawing.

DESCRIPTION OF THE PREFERRED EMBODIMENT

Figure 1:
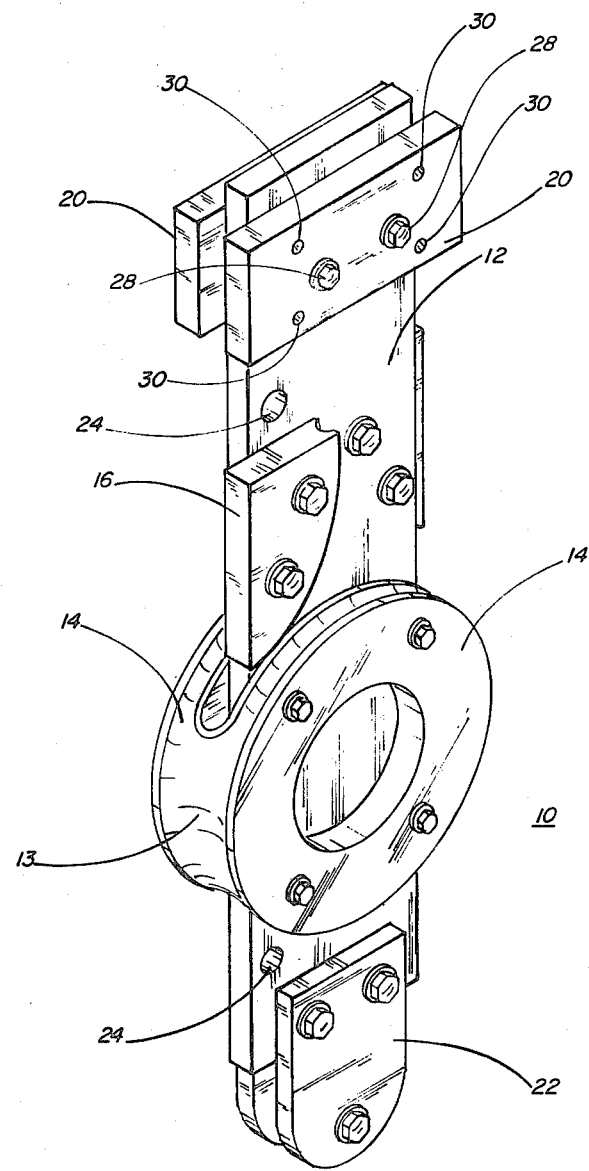
FIG. 1 is a perspective view of a reusable cable termination according to the present invention.
Figure 2:
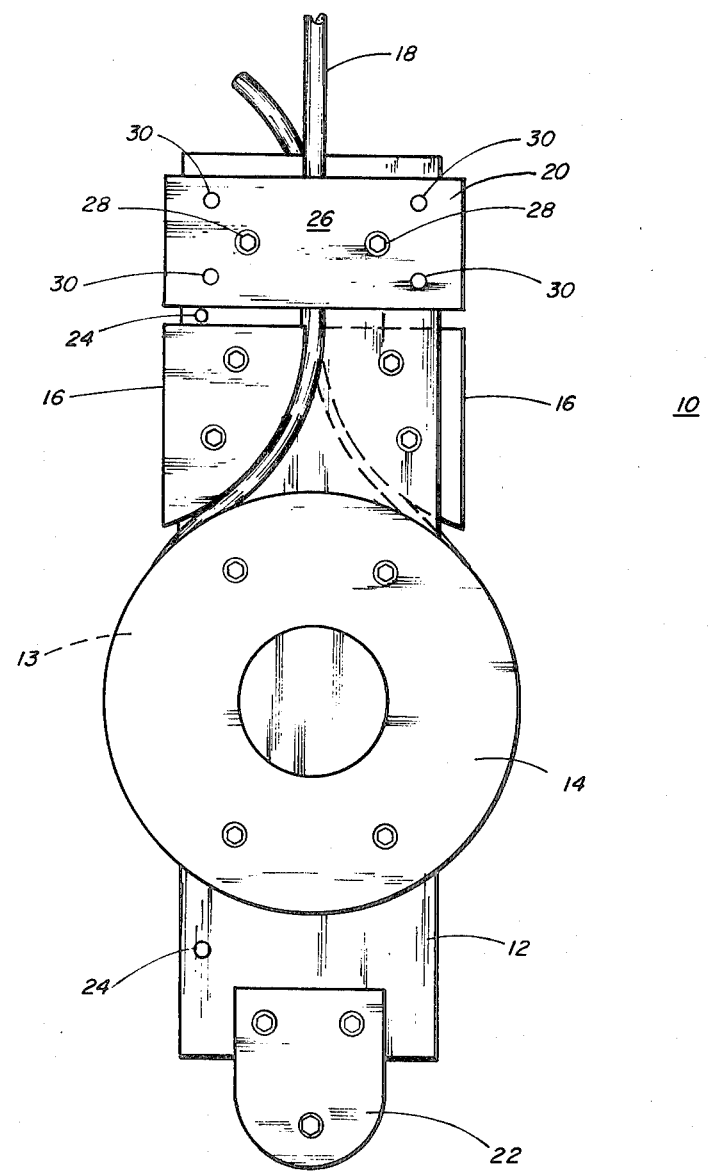
FIG. 2 is a side plan view of the reusable cable termination.
Figure 3:
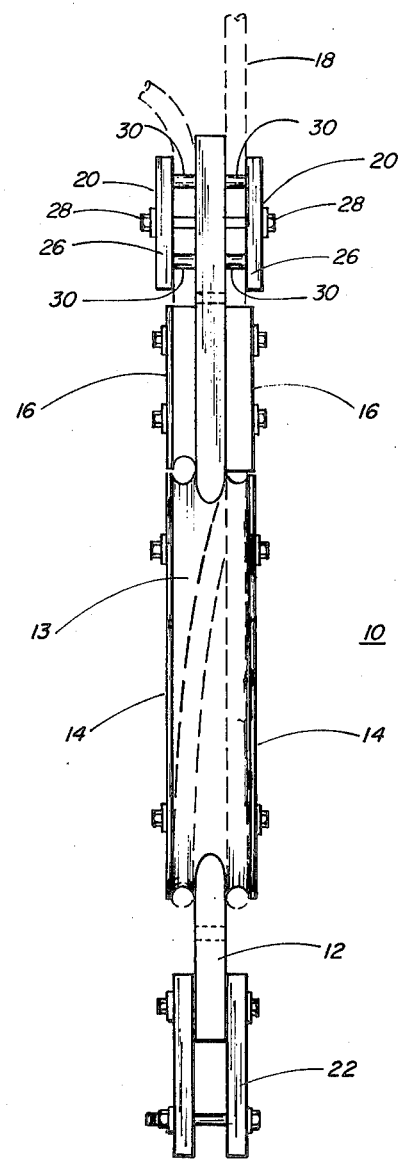
FIG. 3 is a front plan view of the reusable cable termination.

Referring now to FIGS. 1-3 a reusable cable termination 10 is shown. A main frame 12 is essentially in the form of a rectangular plate. A pair of grooved discs 14 are immovably mounted flat on either side of the main frame 12 so that they are side-by-side. A crossover section 13 is provided between the discs to allow a cable 18 to smoothly pass from one disc 14 to the other. Above the discs 14 on the main frame 12 are immovably mounted a pair of opposing transition segments 16 which have grooved, arcuate cable bearing surfaces so that the cable 18 makes a smooth turn upon entering and leaving the discs. Mounted at the top of main frame 12 on each side is a bowspring clamp 20. The center of the clamp 20 has a concave segmented cylindrical area (not shown in the drawing) for snug areal contact with the clamped cable 18. Mounted at the bottom of the main frame 12 is means, such as a fixed shackle 22, for supporting a load or suspended vehicle. Also grapevine holes 24 may be provided in the main frame 12 for the attachment of safety lines which are tied to the load (from the lower grapevine hole) and attached by a grapevine to the cable 18 (from the upper grapevine hole).

Although the termination 10 is depicted in the drawing as being built up with cut-outs from flat plates and then bolted together, the main frame 12, the grooved discs 14, the crossover section 13 and the transition segments 16 may be part of one integral casting. The discs 14 may be mounted on one side of the main frame 12 and the main frame may be of any suitable shape so long as the working elements, the discs 14, transition segments 16 and clamps 20, are maintained in appropriate working relationship to each other. The material of the termination 10 may be any, such as nylon, aluminum, titanium, etc., which has the requisite strength and corrosion resistance so that it will not contribute trace element contamination in the environment.

In operation the reusable cable termination 10 makes use of "capstan action". When a rope under great tension turns around a fixed cylinder, tangential frictional forces occur to reduce that tension as a negative-exponential function of the angle turned. Thus a "small" tension after the capstan will be unidirectionally amplified to "great" tension ahead of the capstan. The elements of the termination 10 which provide capstan action are the crossover section 13, the discs 14 and the transition segments 16.

The end of the cable 18 is held by one of the bowspring clamps 20 which is a shaped flat spring 26 which clamps the cable in its center. The clamping force of the spring 26 on the cable 18 is caused by bolts 28 near the outer edges of the spring. To stop lateral movements and impact shocks the spring 26 slides on dowel pins 30 with a small clearance. The clamp 20 maintains clamping action despite diametrical shrinking of the cable under pressure. The cable 18 then passes over one of the transition segments 16 which provides a cable turn of controlled radius so that the cable arrives tangentially onto one of the discs 14.

The principal capstan action is provided by the discs 14. The cable 18 makes one turn around one disc 14, then passes laterally over the crossover section 13 to the other disc where it takes another turn. The crossover section 13 may be either slots in the groove walls of the discs 14 to facilitate the transition of the cable from one disc to the other, or a smooth segment may be used for the inter-disc transition. The smooth segment can be part of the main frame 12 having a curved edge to match the radius of the bottom of the grooves of the discs 14. The cable 18 then passes over the other transition section 16 which provides a controlled radius turn so the cable leaves the disc 14 tangentially. The cable 18 finally passes to a supporting platform such as a ship through the other bowspring clamp 20 which serves as an axial guide through which the cable can have linear movement as cable tension changes while maintaining a small minimal tension of the cables around the discs 14 to maintain cable-disc contact despite the fact that the cable tends to spring away. The load, such as a suspended vehicle, is supported from the shackle 22. A first safety line from the suspended vehicle is attached to the lower grapevine hole 24 and a second safety line is attached to the upper grapevine hole and to the cable 18 above the termination 10 by grapevine.

Thus, the present invention provides a reusable cable termination which will not contaminate samples of the environment, which may be detached and used again or relocated on the cable, which is inspectable at all times and which allows inspection of that part of the cable in the termination, which maintains the integrity of the cable surface, and which separates the electrical interface from the mechanical termination so that water leaks from the interface under decreasing pressure conditions are in the hydrodynamic wake of the fish vehicle when ascending.

What is claimed is:

1. A reusable cable termination comprising:
   a main frame;
   a pair of grooved discs rigidly mounted on said main frame situated parallel to each other and having a transition section so that a cable may smoothly pass from one disc to the other;
   means rigidly mounted on said main frame for smoothly guiding said cable onto and off from said discs;
   means mounted on said main frame for securely holding the end of said cable; and
   means mounted on said main frame for axially aligning said cable with said reusable cable termination such that the support portion of said cable is allowed to stretch when under tension yet said cable is inhibited from springing from the surface of said discs and said guiding means;
   whereby said cable is securely terminated by the capstan action caused by a cable turn around each disc and across said guiding means.

2. A reusable cable termination as recited in claim 1 further comprising means for suspending a load from said main frame.

3. A reusable cable termination as recited in claim 2 further comprising means for attaching safety lines to said main frame.

4. A reusable cable termination as recited in claims 1, 2 or 3 wherein said smoothly guiding means comprise a pair of transition segments, each of which are quarter-sections of a grooved disc, mounted on said main frame such that said cable is guided by one of said transition segments onto one of said pair of discs tangentially and is guided off the other one of said pair of discs tangentially by the other one of said transition segments.

5. A reusable cable termination as recited in claim 4 wherein said securely holding means comprises a first bowspring clamp which maintains clamping action despite diametrical shrinking of said cable under pressure.

6. A reusable cable termination as recited in claim 5 wherein said axially aligning means comprises a second bowspring clamp which allows for linear movement of said cable as cable tension changes.

7. A termination for a cable comprising:
   an essentially rectangular main frame having a first side and a second side parallel to said first side:
   a first grooved disc integral with said first side of said main frame such that the diameter of said first grooved disc is parallel with said first side of said main frame;
   a second grooved disc integral with said second side of said main frame, said second grooved disc being situated parallel to and on a level with said first grooved disc;
   a transition section integral with said main frame connecting said first grooved disc with said second grooved disc such that said cable passes smoothly from said first disc to said second disc, said cable taking a turn about each of said discs;
   a first transition segment integral with said first side of said main frame and situated above said first grooved disc, said first transition segment being a grooved quarter-section of a disc being situated such that said cable passing over said first transition segment arrives tangentially onto said first grooved disc;
   a second transition segment integral with said second side of said main frame and situated above said second grooved disc, said second transition segment being a grooved quarter-section of a disc and being situated such that said cable over said second transition segment comes tangentially off said second grooved disc;
   a first bow spring clamp rigidly mounted on said first side of said main frame above said first transition segment such that said cable passes through said first bow spring clamp onto said first transition segment along the major axis of said main frame, said first bow spring clamp allowing the support portion of said cable to stretch longitudinally when under tension while applying sufficient force to prevent said cable from springing away from the grooved surfaces of said first transition segment and said first grooved disc; and
   a second bow spring clamp rigidly mounted on said second side of said main frame above said second transition segment such that said cable passes from said second transition segment through said second bow spring clamp along the major axis of said main frame, said second bow spring clamp securely holding the end portion of said cable;
   whereby said cable termination is attached to said cable by the capstan action provided by the turns of said cable about said first and second transition segments and said first and second grooved discs while all portions of said cable are open to visual inspection.

* * * * *